United States Patent
Nishida

(10) Patent No.: US 10,694,125 B2
(45) Date of Patent: Jun. 23, 2020

(54) SOLID-STATE IMAGING ELEMENT, METHOD OF OPERATING SOLID-STATE IMAGING ELEMENT, IMAGING APPARATUS, AND ELECTRONIC DEVICE

(71) Applicant: SONY SEMICONDUCTOR SOLUTIONS CORPORATION, Kanagawa (JP)

(72) Inventor: Yuusuke Nishida, Fukuoka (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 13 days.

(21) Appl. No.: 16/095,685

(22) PCT Filed: Apr. 14, 2017

(86) PCT No.: PCT/JP2017/015213
§ 371 (c)(1),
(2) Date: Oct. 22, 2018

(87) PCT Pub. No.: WO2017/188018
PCT Pub. Date: Nov. 2, 2017

(65) Prior Publication Data
US 2019/0132531 A1    May 2, 2019

(30) Foreign Application Priority Data
Apr. 28, 2016  (JP) .................... 2016-092077

(51) Int. Cl.
*H04N 5/357*    (2011.01)
*H04N 5/378*    (2011.01)
(Continued)

(52) U.S. Cl.
CPC .......... *H04N 5/357* (2013.01); *H04N 5/3577* (2013.01); *H04N 5/378* (2013.01); *H04N 5/3745* (2013.01); *H04N 9/045* (2013.01)

(58) Field of Classification Search
CPC .... H04N 5/357; H04N 5/3577; H04N 5/3745; H04N 9/045; H04N 5/378
(Continued)

(56) References Cited

U.S. PATENT DOCUMENTS

2008/0239124 A1\* 10/2008 Mori ................. H04N 5/3655
                                                          348/308
2011/0095169 A1\* 4/2011 Takenaka ............ H04N 5/3658
                                                          250/208.1
(Continued)

FOREIGN PATENT DOCUMENTS

JP    2015-233341 A    12/2005
JP    2007-036457 A     2/2007
(Continued)

OTHER PUBLICATIONS

International Search Report and Written Opinion of PCT Application No. PCT/JP2017/015213, dated Jun. 13, 2017, 09 pages of ISRWO.

*Primary Examiner* — Lin Ye
*Assistant Examiner* — Chan T Nguyen
(74) *Attorney, Agent, or Firm* — Chip Law Group

(57) ABSTRACT

The disclosure relates to a solid-state imaging element, a method of operating the solid-state imaging element, an imaging apparatus, and an electronic device. The solid-state imaging element enables appropriate measurement of fluctuation of power supply voltage, and removal of noise caused by the fluctuation of the power supply voltage by using the measured fluctuation of the power supply voltage. In a case where analog/digital conversions of pixel signals are performed at different timings being not overlapped on
(Continued)

a line basis, during a period, on the line basis, in which reading and analog/digital conversions are sequentially performed on the line basis, voltage of power supply to be supplied to associated pixels is sampled. The disclosure is applicable to solid-state imaging elements.

11 Claims, 13 Drawing Sheets

(51) Int. Cl.
*H04N 5/3745* (2011.01)
*H04N 9/04* (2006.01)

(58) Field of Classification Search
USPC .......................................................... 348/241
See application file for complete search history.

(56) References Cited

U.S. PATENT DOCUMENTS

2011/0115959 A1    5/2011  Toyama et al.
2014/0048685 A1*  2/2014  Zhang .................... H04N 5/365
                                                                                  250/208.1

FOREIGN PATENT DOCUMENTS

| JP | 2007-180654 A | 7/2007 |
| JP | 2009-168683 A | 7/2009 |
| JP | 2011-109282 A | 6/2011 |
| JP | 2015-233341 A | 12/2015 |
| WO | 2011/119466 A2 | 9/2011 |

* cited by examiner

SOLID-STATE IMAGING ELEMENT, METHOD OF OPERATING SOLID-STATE IMAGING ELEMENT, IMAGING APPARATUS, AND ELECTRONIC DEVICE

CROSS REFERENCE TO RELATED APPLICATIONS

This application is a U.S. National Phase of International Patent Application No. PCT/JP2017/015213 filed on Apr. 14, 2017, which claims priority benefit of Japanese Patent Application No. JP 2016-092077 filed in the Japan Patent Office on Apr. 28, 2016. Each of the above-referenced applications is hereby incorporated herein by reference in its entirety.

TECHNICAL FIELD

The present disclosure relates to a solid-state imaging element, a method of operating the solid-state imaging element, an imaging apparatus, and an electronic device. In particular, the disclosure relates to a solid-state imaging element capable of reducing influence of fluctuation of power supply voltage, a method of operating the solid-state imaging element, an imaging apparatus, and an electronic device.

BACKGROUND ART

A complementary metal oxide semiconductor (CMOS) image sensor (CIS) simultaneously reads pixel signals generally on a line basis, and generates one image by repeating the reading control on the line basis.

The pixel signals contain various pieces of noise, and methods of removing the noise have been proposed.

The pixel signals include, for example, noise caused by variation of transistor characteristics or fluctuation of power supply voltage.

Then, technology for reducing the noise of pixel signals caused by the variation of transistors is proposed (see Patent Document 1).

In addition, some cases where fluctuation of power supply voltage during operation of a logic circuit affects image quality as noise have recently occurred, which is an obstacle against improvement of the image quality.

Countermeasures for inhibiting the fluctuation itself of power supply voltage have been conventionally undertaken by strengthening external parts and board wiring against the fluctuation of the power supply voltage.

CITATION LIST

Patent Document

Patent Document 1: Japanese Patent Application Laid-Open No. 2007-180654

SUMMARY OF THE INVENTION

Problems to be Solved by the Invention

If the fluctuation itself of the power supply voltage can be detected, however, information to control the source by inventiveness in control can be obtained. Consequently, simpler countermeasures can be undertaken.

For this purpose, the fluctuation of the power supply voltage is required to be appropriately detected.

In order to restore a sine wave of f=100 MHz, sampling data of doubled 200 MHz is generally required. In a case where a readout period on a line basis is approximately 5 us, 1000 points of data are required to restore the fluctuation of the power supply voltage during reading for one line.

An AD conversion at 1 point=5 ns is unrealistic in terms of speed, and thus a plurality of AD conversion units is required to be arranged. This is, however, also unrealistic since a mounting area is limited.

The disclosure has been made in view of such a situation. In particular, the disclosure enables appropriate measurement of the fluctuation of the power supply voltage with a simple apparatus configuration and enables removal of noise caused by the fluctuation of the power supply voltage by using the measured fluctuation of the power supply voltage.

Solutions to Problems

A solid-state imaging element according to one aspect of the disclosure includes an imaging element including a plurality of pixels arranged in a two-dimensional array, the pixels each generating a pixel signal in response to a light amount of incident light, a pixel signal analog/digital conversion unit that reads the pixel signals on a line basis, and sequentially performs analog/digital conversions of the pixel signals on the line basis, a sampling unit that samples voltage of a power supply configured to supply power, and an operation control unit that controls operation of the sampling unit, in which the operation control unit causes the sampling unit to sample the voltage of the power supply at different timings being not overlapped on the line basis, during a period, on the line basis, in which the pixel signal analog/digital conversion unit sequentially performs reading and analog/digital conversions on the line basis.

The operation control unit enables the sampling unit to sample the voltage of the power supply at a timing shifted, on the line basis, from the timing at which a sampling is performed in the most recent processing, during a period, on the line basis, in which the pixel signal analog/digital conversion unit sequentially performs reading and analog/digital conversions on the line basis.

The operation control unit enables the sampling unit to sample the voltage of the power supply at a timing adjacent, on the line basis, to the timing at which a sampling is performed in the most recent processing, during a period, on the line basis, in which the pixel signal analog/digital conversion unit sequentially performs reading and analog/digital conversions on the line basis.

In a case where analog/digital conversions are performed at different timings being not overlapped on the line basis during a period, on the line basis, in which the pixel signal analog/digital conversion unit sequentially performs reading and analog/digital conversions on the line basis, the operation control unit enables the sampling unit to sample the voltage of the power supply, can determine a waveform containing intra-line variation and inter-line variation of the voltage of the power supply from sampling results at all of different timings being not overlapped on the line basis, and can store the waveform.

The operation control unit enables the sampling unit to further sample the voltage of the power supply at the same timing, on the line basis, as the timing at which a sampling is performed in the most recent processing, during a period, on the line basis, in which the pixel signal analog/digital conversion unit sequentially performs reading and analog/digital conversions on the line basis.

The operation control unit enables the sampling unit to further sample the voltage of the power supply at the same timing as, on the line basis, the timing at which a sampling is performed in the most recent processing, during a period, on the line basis, in which the pixel signal analog/digital conversion unit sequentially performs reading and analog/digital conversions on the line basis, can determine an inter-line variation waveform of the voltage of the power supply from sampling results, and can store the inter-line variation waveform.

The operation control unit enables the sampling unit to sample the voltage of the power supply at different timings being not overlapped on the line basis, during a period, on the line basis, in which the pixel signal analog/digital conversion unit sequentially performs reading and analog/digital conversions on the line basis, can determine a waveform containing intra-line variation and inter-line variation of the voltage of the power supply from sampling results at all of different timings being not overlapped on the line basis, and can store the waveform. The operation control unit enables the sampling unit to further sample the voltage of the power supply at the same timing as, on the line basis, the timing at which a sampling is performed in the most recent processing, during a period, on the line basis, in which the pixel signal analog/digital conversion unit sequentially performs reading and analog/digital conversions on the line basis, can determine an inter-line variation waveform of the voltage of the power supply from sampling results, and can store the inter-line variation waveform. The operation control unit can also determine the intra-line variation waveform by subtracting the inter-line variation waveform from the waveform containing intra-line variation and inter-line variation and can correct an amplitude of the voltage of the power supply by using the intra-line variation waveform.

A power supply voltage analog/digital conversion unit that performs an analog/digital conversion of an amplitude of the voltage of the power supply sampled by the sampling unit can be further included, in which the operation control unit enables the sampling unit to sample the subsequent voltage of the power supply after the power supply voltage analog/digital conversion unit performs an analog/digital conversion of the voltage of the power supply sampled most recently.

In a case where analog/digital conversions are performed at different timings being not overlapped on the line basis during a period, on the line basis, in which the pixel signal analog/digital conversion unit sequentially performs reading and analog/digital conversions on the line basis after the power supply voltage analog/digital conversion unit performs an analog/digital conversion of the voltage of the power supply sampled most recently by the sampling unit, the operation control unit enables the sampling unit to sample the voltage of the power supply.

A method of operating a solid-state imaging element according to one aspect of the disclosure is a method of operating a solid-state imaging element, the solid-state imaging element including an imaging element including a plurality of pixels arranged in a two-dimensional array, the pixels each generating a pixel signal in response to a light amount of incident light, a pixel signal analog/digital conversion unit that reads the pixel signals on a line basis, and sequentially performs analog/digital conversions of the pixel signals on the line basis, a sampling unit that samples voltage of a power supply configured to supply power, and an operation control unit that controls operation of the sampling unit, in which the operation control unit causes the sampling unit to sample the voltage of the power supply to be supplied to the pixels at different timings being not overlapped on the line basis, during a period, on the line basis, in which the pixel signal analog/digital conversion unit sequentially performs reading and analog/digital conversions on the line basis.

An imaging apparatus according to one aspect of the disclosure includes an imaging element including a plurality of pixels arranged in a two-dimensional array, the pixels each generating a pixel signal in response to a light amount of incident light, a pixel signal analog/digital conversion unit that reads the pixel signals on a line basis, and sequentially performs analog/digital conversions of the pixel signals on the line basis, a sampling unit that samples voltage of a power supply configured to supply power, and an operation control unit that controls operation of the sampling unit, in which the operation control unit causes the sampling unit to sample the voltage of the power supply at different timings being not overlapped on the line basis, during a period, on the line basis, in which the pixel signal analog/digital conversion unit sequentially performs reading and analog/digital conversions on the line basis.

An electronic device according to one aspect of the disclosure includes an imaging element including a plurality of pixels arranged in a two-dimensional array, the pixels each generating a pixel signal in response to a light amount of incident light, a pixel signal analog/digital conversion unit that reads the pixel signals on a line basis, and sequentially performs analog/digital conversions of the pixel signals on the line basis, a sampling unit that samples voltage of a power supply configured to supply power, and an operation control unit that controls operation of the sampling unit, in which the operation control unit causes the sampling unit to sample the voltage of the power supply at different timings being not overlapped on the line basis, during a period, on the line basis, in which the pixel signal analog/digital conversion unit sequentially performs reading and analog/digital conversions on the line basis.

In one aspect of the disclosure, a pixel signal is generated in response to a light amount of incident light by an imaging element including a plurality of pixels arranged in a two-dimensional array, the pixel signals are read on a line basis, the pixel signals on the line basis are subject to sequential analog/digital conversions, voltage of a power supply configured to supply power is sampled, and operation of the sampling is controlled, and the voltage of the power supply is sampled at different timings being not overlapped on the line basis, during a period, on the line basis, in which reading and analog/digital conversions are sequentially performed on the line basis.

Effects of the Invention

One aspect of the disclosure enables appropriate measurement of fluctuation of power supply voltage and removal of noise caused by the fluctuation of the power supply voltage by using the measured fluctuation of the power supply voltage.

MODE FOR CARRYING OUT THE INVENTION

A preferred embodiment of the disclosure will be described in detail below with reference to the accompanying drawings. Note that, in the specification and the drawings, constituent elements having substantially the same functional configuration are given the same signs, and repeated description will be omitted.

<Outline of Measurement of Fluctuation of Power Supply Voltage in the Disclosure>

In describing technology of the disclosure, measurement of fluctuation of power supply voltage in the disclosure will first be outlined.

Figure 1:
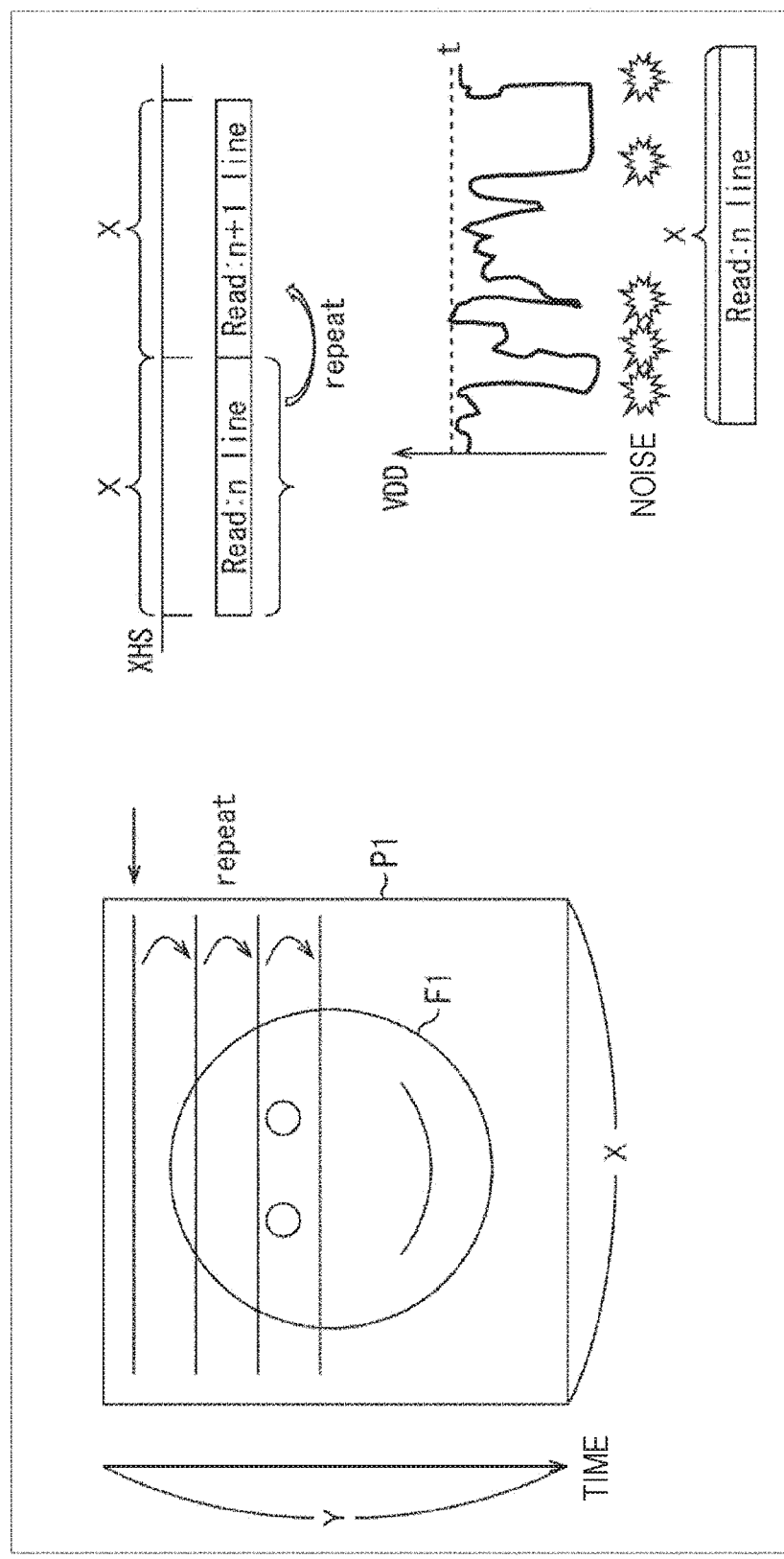
FIG. 1 is a diagram illustrating variation (fluctuation) of power supply voltage during AD conversions of pixel signals.

For example, in a case where an imaging element having a pixel array of X columns×Y lines captures an image P1 containing a face F1 in a left part of FIG. 1, pixel signals are read line by line sequentially from an upper line on a line basis. At this time, pixel signals in each line are simultaneously read on a pixel basis.

As a result, as illustrated in an upper right part of FIG. 1, pixel signals in the n-th line are read (Read: n line), and then, signals in the (n+1)-th line are read in a time series. Y times repetition of the processing allows the pixel signals of one image to be read.

At this time, in a case where pixel signals in each line are read, power supply voltage during reading of each of the pixel signals should be constant under normal conditions, but the power supply voltage varies (fluctuates) as illustrated in a lower right part of FIG. 1, for example. Note that, a waveform of the power supply voltage during a period of reading the pixel signals in the n-th line is illustrated in the lower right part of FIG. 1.

The power supply voltage should be constant under normal conditions, and thus the fluctuation of the power supply voltage affects pixel signals as noise. As a result, the image quality may be lowered.

It is known that the waveform, which exhibits the fluctuation of the power supply voltage, illustrated in the lower right part of FIG. 1 is substantially the same as that in each line. Consequently, if the waveform can be measured, corrections for removing noise contained in pixel signals due to the fluctuation of the power supply voltage are made possible.

Then, measurement of power supply voltage during analog/digital conversions of the pixel signals in each line at the power supply voltage will be considered.

Figure 2:
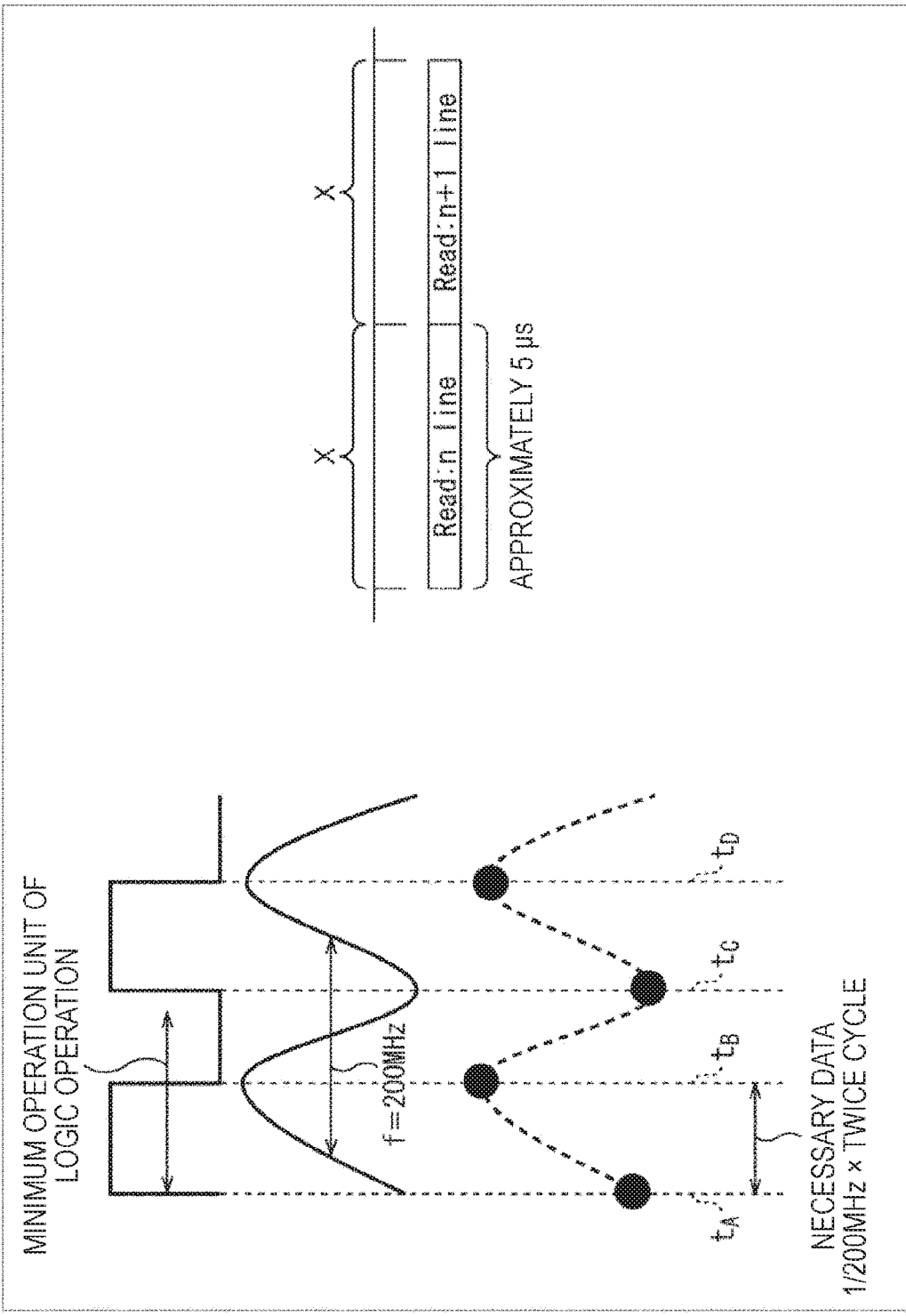
FIG. 2 is a diagram illustrating difficulty in directly measuring the fluctuation of the power supply voltage.

For example, as illustrated in a left part of FIG. 2, in a case where 200 MHz clock signals are used, the minimum unit of logic operation with the clock signals is 5 us. As illustrated in a right part of FIG. 2, however, the time period required for reading and analog/digital conversions of pixel signals in one line is also approximately 5 us. This means that measurement results of approximately 2000 points are required to be obtained by the waveform measurement within this 5 us, and in a case of processing with one analog/digital (AD) converter, AD conversions at approximately 2.5 ns per point are required. This is not realistic no matter how fast the performance of the AD converter is. If a plurality of AD converters is used, the number of necessary AD converters increases. Securing itself of mounting areas is also difficult.

Figure 3:
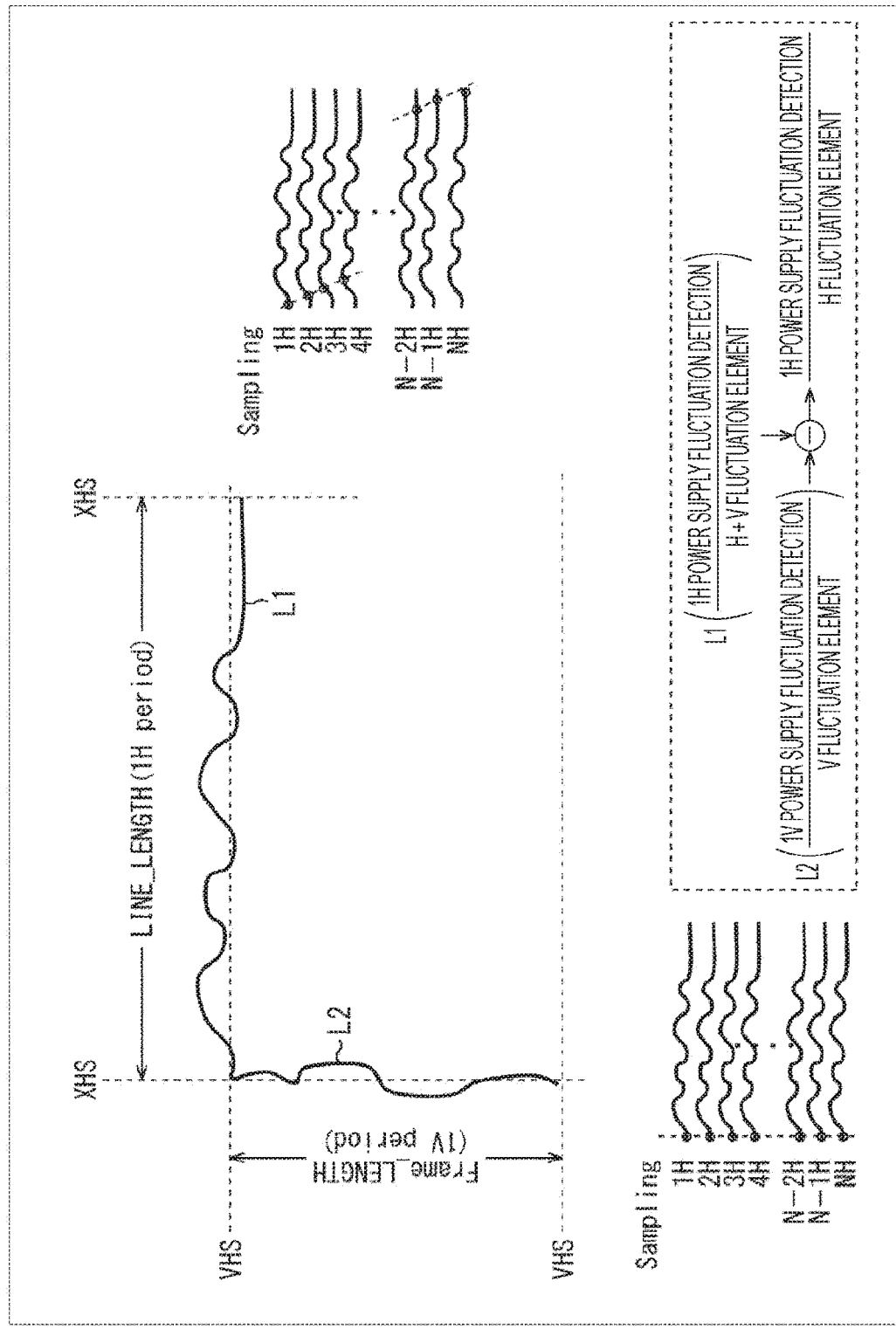
FIG. 3 is a diagram outlining measurement of the fluctuation of the power supply voltage, the technology of the disclosure being applied to the measurement.

Therefore, in technology of the disclosure, for example, as illustrated in an upper right part of FIG. 3, power supply voltage is measured at a partial timing during a readout period for one line, and the measurement is repeated in each line while the timing is shifted. In such a way, measurement results in the entire readout period for one line are determined, and a waveform, which represents fluctuation of power supply voltage, as illustrated in a waveform L1 in an upper left part of FIG. 3 is determined.

Note that this waveform L1 contains fluctuation of the power supply voltage over different lines (hereinafter also referred to as an inter-line voltage) together with the fluctuation of the power supply voltage during the readout period for one line (hereinafter also referred to as intra-line variation). Then, with respect to the inter-line variation, the inter-line variation represented by a waveform L2 in an upper right part of FIG. 3 is determined by measuring the power supply voltage at the same timing during a period of analog/digital conversions of pixel signals for each line as illustrated in a lower left part of FIG. 3.

Then, as illustrated in a lower right part of FIG. 3, pure intra-line variation is determined by subtracting an element of the waveform L2 including an element of the inter-line variation from the waveform L1 including both of the elements of the intra-line variation and the inter-line variation.

Note that, in the lower right part of FIG. 3, the element of the intra-line variation is referred to as an "H fluctuation element", the element of the inter-line variation is referred to as a "V fluctuation element", and the element including both of the fluctuations is referred to as an "H+V fluctuation element".

A waveform, which is desired to be determined, of the element of the intra-line variation including the "H fluctuation element" can be determined by subtracting the "V fluctuation element" measured at the same timing in each line, that is, the waveform L2 including the element of the inter-line variation from the "H+V fluctuation element" measured at each timing while the timing for measuring the power supply voltage is shifted in each line, that is, the waveform L1 including both of the elements of the intra-line variation and the inter-line variation.

Note that, in upper right and lower left parts of FIG. 3, waveforms representing fluctuations of the power supply voltage in each line 1H, 2H, . . . NH are illustrated, and black dots represent measurement positions in the horizontal direction. In addition, as illustrated by dotted lines in the upper right part, a measurement timing is shifted at predetermined intervals in each line in the right direction in the figures, that is, the direction delayed in a time direction. Furthermore, as illustrated by a dotted line also in the lower left part of FIG. 3, measurement timings of the power supply voltage in each line 1H, 2H, . . . NH are the same, and fluctuation of the power supply voltage over lines (inter-line variation) is measured.

In the upper left part of FIG. 3, the waveform L1 and the waveform L2 are illustrated. The waveform L1 contains both of the intra-line variation and the inter-line variation. The waveform L2 represents the inter-line variation.

Configuration Example of One Embodiment of the Disclosure

A solid-state imaging element of the disclosure will now be described with reference to FIG. 4.

Figure 4:
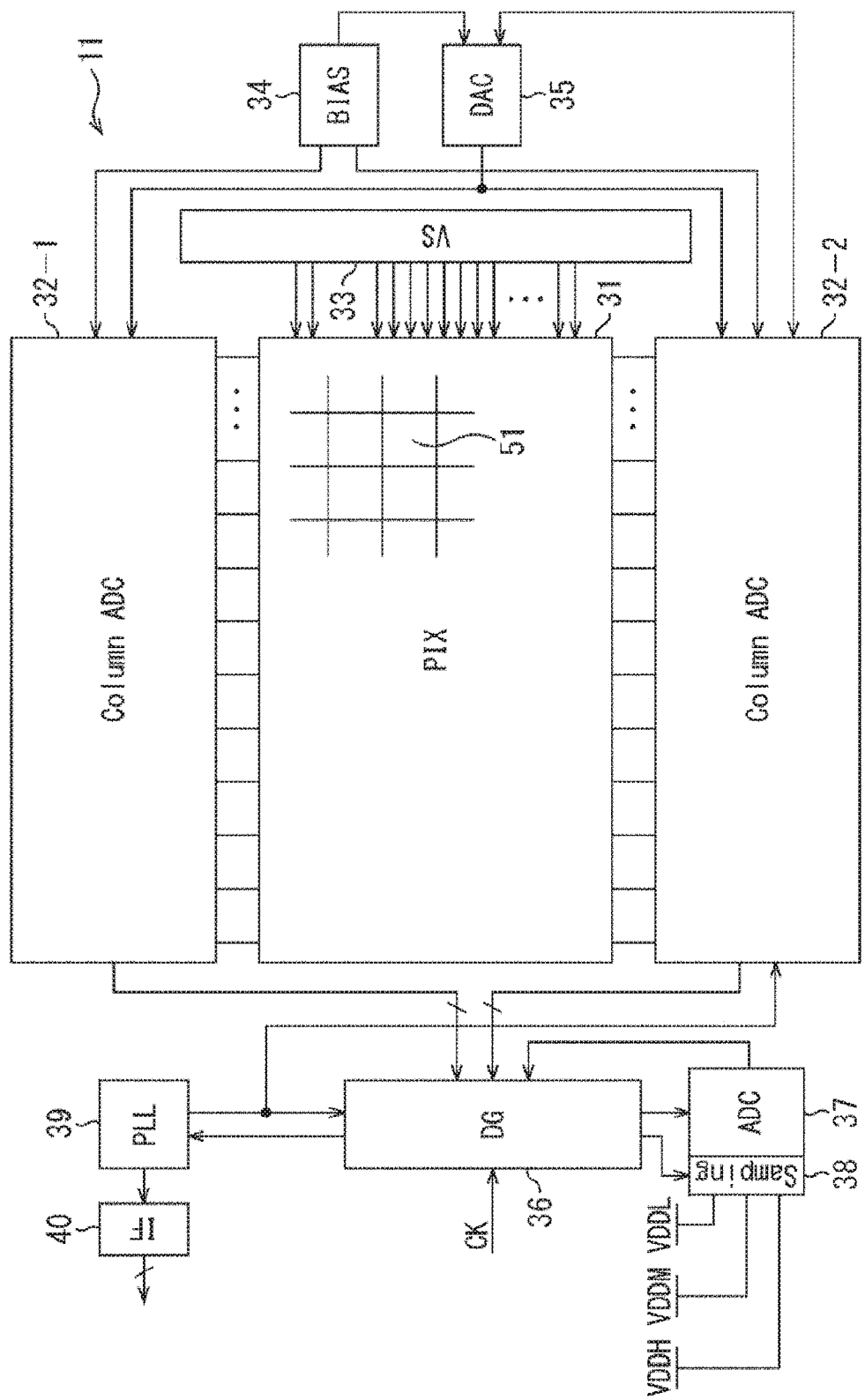
FIG. 4 is a diagram illustrating a configuration example of a solid-state imaging element to which the technology of the disclosure is applied.

A solid-state imaging element 11 illustrated in FIG. 4 includes a pixel array (PIX) 31, column analog digital converters (column ADCs) 32-1 and 32-2, a vertical transfer control unit (VS) 33, a bias circuit (BIAS) 34, a digital analog converter (DAC) 35, a digital circuit (DG) 36, an analog digital conversion circuit (AD) 37, a sampling circuit (sampling) 38, a phase locked loop (PLL) 39 and an Interface (IF) 40.

The pixel array 31 includes a plurality of pixels 51 arranged in a two-dimensional array, and outputs analog pixel signals to the column ADC 32-1 or 32-2 on a line basis in response to a control signal from the vertical transfer control unit 33.

In synchronization with a clock signal supplied from the PLL 39, the column ADCs 32-1 and 32-2 convert the analog pixel signals into digital pixel signals on the basis of a standard voltage and a reference voltage respectively supplied from the bias circuit 34 and the DAC 35, and output the digital pixel signals to the digital circuit 36.

The digital circuit 36 controls timings of the sampling circuit 38. The sampling circuit 38 samples (measures) power supply voltage (in FIG. 4, three kinds of power supply voltages: high voltage (VDDH), medium voltage (VDDM) and low voltage (VDDL)) at a designated timing, and supplies the measurement results to the AD 37.

Note that, although, in this example, the high voltage power supply (VDDH), the medium voltage power supply (VDDM), and the low voltage power supply (VDDL) can be simultaneously measured as power supply voltages, any one or two of the power supply voltages may be measured. In addition, in the following description, those are simply referred to as power supplies VDDs when not necessary to particularly distinguish them.

The digital circuit 36 controls timings of the analog digital conversion circuit (AD) 37. The AD 37 converts an analog signal of voltage of the power supply VDD, which is a sampling result supplied from the sampling circuit 38, into a digital signal, and outputs the digital signal to the digital circuit 36.

In synchronization with a clock signal supplied from the PLL 39, the digital circuit 36 causes the sampling circuit 38 to sample the voltage of the power supply VDD, and causes the AD 37 to perform an AD conversion of the sampling result.

The digital circuit 36 sequentially stores the sampling results of the voltage of the power supply VDD converted into the digital signals, and generates and stores the waveforms L1 and L2 illustrated in FIG. 3 described above. Furthermore, the digital circuit 36 removes noise caused by fluctuation of the voltage of the power supply VDD from the pixel signal including the digital signal supplied from the column ADCs 32-1 and 32-2 on the basis of the generated waveforms L1 and L2. The digital circuit 36 then supplies the resulting pixel signal to the PLL 39, and outputs the pixel signal from the IF40 in synchronization with a predetermined signal.

<Configuration Example of Pixel Circuit>

Figure 5:
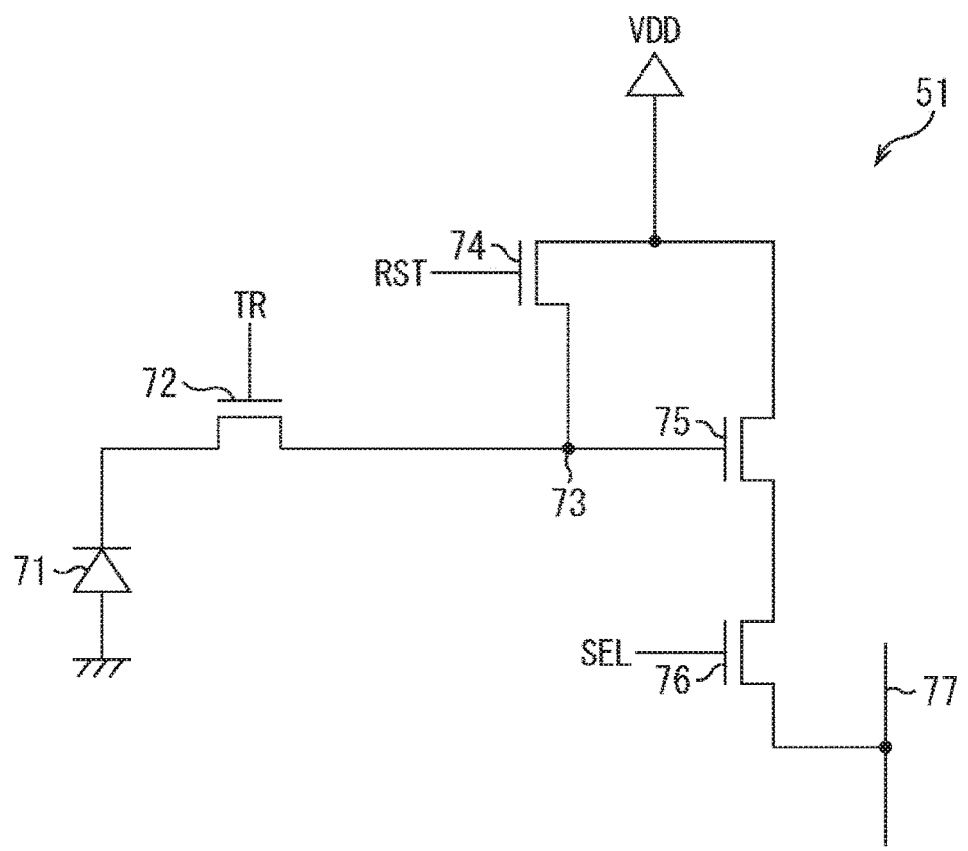
FIG. 5 is a diagram illustrating a configuration example of a pixel in a pixel array in FIG. 4.

A configuration example of the pixel 51 will now be described with reference to FIG. 5.

The pixel 51 includes a photodiode 71 serving as a photoelectric conversion element, a transfer transistor 72, a floating diffusion (FD) 73, a reset transistor 74, an amplification transistor 75, and a selection transistor 76.

The photodiode 71 generates and accumulates charges (signal charges) in response to an amount of received light. An anode terminal of the photodiode 71 is grounded, and a cathode terminal thereof is connected to the FD 73 via the transfer transistor 72.

When turned on by a transfer signal TR, the transfer transistor 72 reads the charges generated by the photodiode 71, and transfers the charges to the FD 73.

The FD 73 holds the charges read from the photodiode 71. When turned on by a reset signal RST, the reset transistor 74 resets a potential of the FD 73 by discharging the charges accumulated in the FD 73 to a drain (power supply VDD).

The amplification transistor 75 outputs a pixel signal in accordance with the potential of the FD 73. That is, the amplification transistor 75 constitutes a source follower circuit together with a load MOS (not illustrated) serving as a constant current source, which is connected via a vertical signal line 77. The pixel signal, which shows a level corresponding to the charges accumulated in the FD 73, is output from the amplification transistor 75 to the column ADCs 32-1 and 32-2 via the selection transistor 76 and the vertical signal line 77.

The selection transistor 76 is turned on in a case where the pixel 51 is selected by a selection signal SEL, and outputs the pixel signal of the pixel 51 to the column ADCs 32-1 and 32-2 via the vertical signal line 77. The transfer signal TR, the selection signal SEL, and the reset signal RST are supplied from the vertical transfer control unit (VS) 33.

Although the pixel 51 can be configured as described above, the configuration thereof is not limited to this configuration, and other configurations can be adopted.

That is, in each pixel 51, fluctuation of the voltage of the power supply VDD serving as a drain at a reading timing changes the reset potential, and then the pixel signal changes, resulting in noise. In addition, the power supply VDD that can be a source of noise is not limited to the power supply VDD in FIG. 5, but includes variation of a power supply VDD of another apparatus such as the column ADCs 32-1 and 32-2.

<Intra-Line Variation+Inter-Line Variation Measurement Processing>

Figure 6:
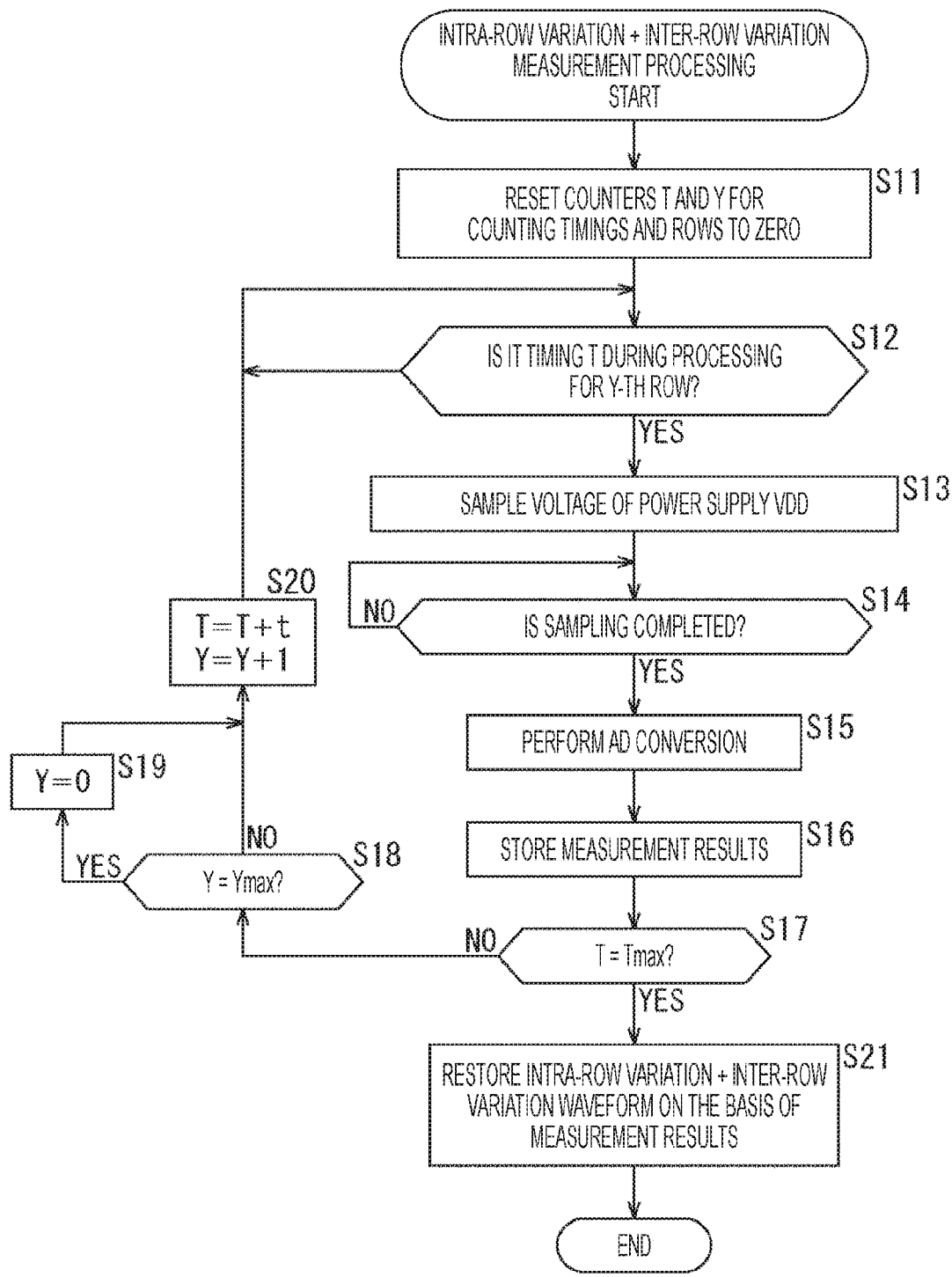
FIG. 6 is a flowchart illustrating measurement processing of a power supply voltage amplitude in the horizontal direction.

Intra-line variation+inter-line variation measurement processing (measurement processing for the waveform L1, which is the H+V fluctuation element in FIG. 3) with the solid-state imaging element 11 in FIG. 4 will now be described with reference to the flowchart of FIG. 6. Incidentally, it is presupposed that pixel signals are read on a line basis, and the column ADCs 32-1 and 32-2 repeat AD conversion processing in parallel with the processing.

In Step S11, the digital circuit 36 initializes counters T and Y for counting timings and lines to zero.

In Step S12, the digital circuit 36 determines whether or not it is a timing T during a readout period for pixel signals in the Y-th line with the column ADCs 32-1 and 32-2 (whether or not a time period T has elapsed since the start of the period for reading the pixel signals in the Y-th line), and repeats the similar processing until the timing T during the period for reading the pixel signals in the Y-th line. Then, in a case where the timing T during the readout period for the pixel signals in the Y-th line comes in Step S12, the processing proceeds to Step S13.

In Step S13, the digital circuit 36 causes the sampling circuit 38 to sample voltage of a power supply VDD.

In Step S14, the digital circuit 36 determines whether or not the sampling circuit 38 completes the sampling, and repeats the similar processing until the sampling is completed. Then, in Step S14, in a case where the sampling circuit 38 completes the sampling of the voltage of the power supply VDD and outputs the sampling results to the AD unit 37, the sampling is regarded as completed, and the processing proceeds to Step S15.

In Step S15, the digital circuit 36 causes the AD 37 to convert the voltage of the power supply VDD, which is to be a sampling result, from an analog signal to a digital signal.

In Step S16, the digital circuit 36 stores information on the voltage of the power supply VDD converted into the digital signal by the AD 37 in association with the timing T during the readout period for the pixel signals in the Y-th line.

In Step S17, the digital circuit 36 determines whether or not the counter T reaches the maximum value Tmax (during the entire period of the readout period for the pixel signals in one line), and in a case where the counter T does not reach the maximum value, the processing proceeds to Step S18.

In Step S18, the digital circuit 36 determines whether or not the counter Y reaches the maximum value Ymax (the number of lines in the vertical direction), and in a case where the counter Y does not reach the maximum value, the processing proceeds to Step S20.

In Step S20, the digital circuit 36 increments the counter Y by one, and increments the counter T by t. The processing then returns to Step S12. Here, t is a value set due to the conversion speed of the AD 37, and means a time required in a case where the processing of Steps S13 to S16 is repeated. That is, setting of this t in accordance with the processing speed of the AD 37 enables achievement of processing with AD converters having various processing speeds.

In contrast, in a case where the counter Y reaches the maximum value Ymax in Step S18, the digital circuit 36 resets the counter Y to 0 in Step S19. That is, the processing is repeated until the processing is performed at all the timings, and thus, in a case where the processing for all lines in the vertical direction of an image is completed, the processing is repeated from the first line again.

That is, until the counter T reaches the maximum value Tmax in Step S17, in other words, until the voltage of the power supply VDD is measured at all timings during the readout period for the pixel signals in one line, the processing of Steps S12 to S20 is repeated.

Then, in a case where the counter T reaches the maximum value Tmax in Step S17, the processing proceeds to Step S21.

In Step S21, the digital circuit 36 restores an intra-line variation+inter-line variation waveform, that is, a waveform corresponding to the waveform L1 in FIG. 3 on the basis of the information on the voltage of the power supply VDD stored in association with the timings, and stores the waveform.

Figure 7:
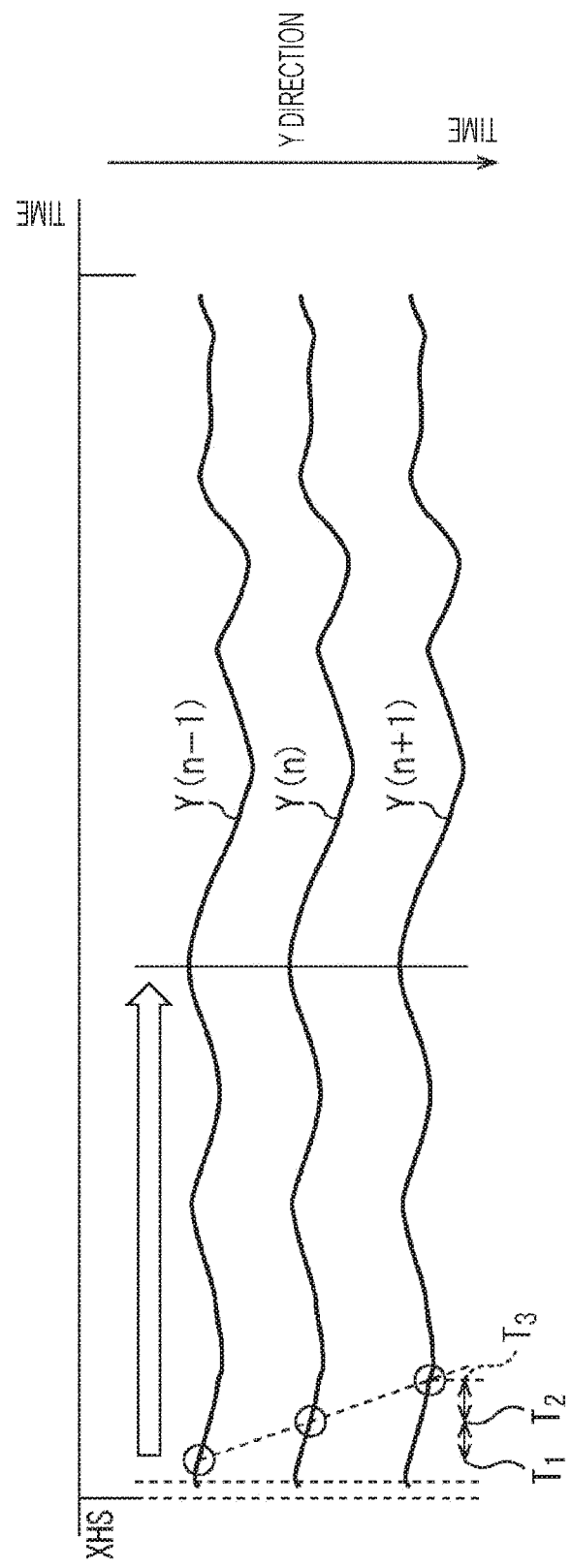
FIG. 7 is a diagram illustrating the measurement processing of the power supply voltage amplitude in the horizontal direction.

As illustrated in FIG. 7, for example, the voltage of the power supply VDD during an AD conversion of a pixel signal of a pixel is measured at successive timings T1, T2, and T3 in each of successive Y(n−1)-th line, Y(n)-th line, and Y(n+1)-th line by the above-described series of processing. FIG. 7 illustrates an example in which the voltage of the power supply VDD of the pixel is measured at the successive timings T in each of the successive lines. Note that, however, in a case where the AD 37 has a low processing speed, for example, the voltage of the power supply VDD may be measured by performing the measurement at a timing in each of a plurality of lines, and shifting the timing on a plurality-of-lines basis.

In any way, it is only necessary to measure the intra-line variation+inter-line variation waveform by allowing the voltage of the power supply VDD to be measured at all timings during a processing period on a line basis.

Figure 8:
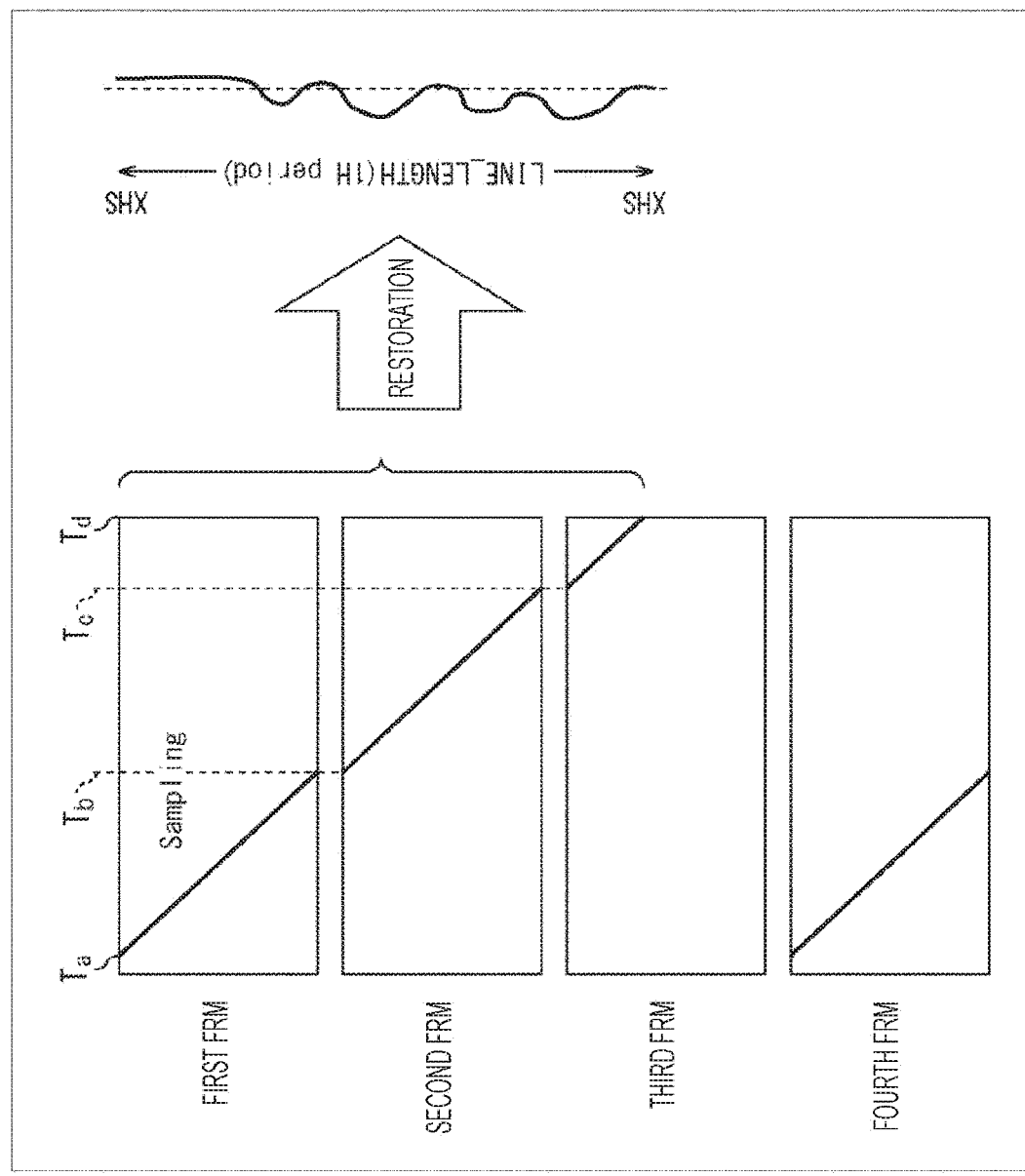
FIG. 8 is a diagram illustrating the measurement processing of the power supply voltage amplitude in the horizontal direction.

Consequently, the intra-line variation+inter-line variation waveform as illustrated in a right part of FIG. 8 may be determined by measuring, in the first frame (frm), the voltage of the power supply VDD at pixels from timing Ta to timing Tb, which constitutes a left end part in the horizontal direction, measuring, in the second frm, the voltage of the power supply VDD at pixels from timing Tb to timing Tc, and measuring, in the third frm, the voltage of the power supply VDD at pixels from timing Tc to timing Td, as illustrated in a left part of FIG. 8, for example.

Note that, in the left part of FIG. 8, straight lines indicate a locus of timings, from the first frm to the fourth frm, at which the voltage of the power supply VDD is sampled, and in the right part of the figure, a waveform of the sampled voltage of the power supply VDD is illustrated. The waveform illustrated in the right part of FIG. 8 corresponds to the waveform L1 in FIG. 3.

<Inter-Line Variation Measurement Processing>

Figure 9:
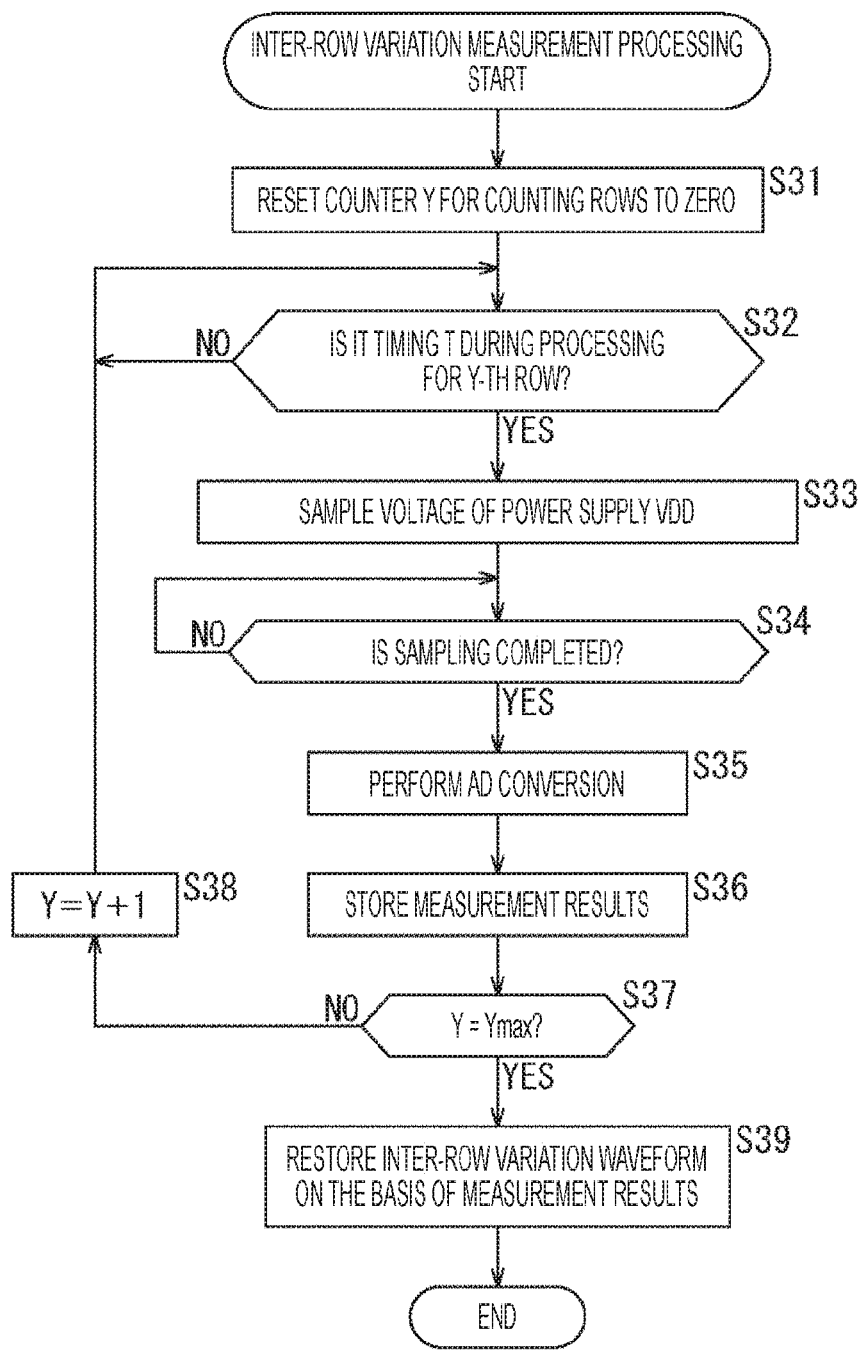
FIG. 9 is a flowchart illustrating measurement processing of a power supply voltage amplitude in the vertical direction.

Inter-line variation measurement processing (measurement processing for the waveform L2, which is the V fluctuation element in FIG. 3) with the solid-state imaging element 11 in FIG. 4 will now be described with reference to the flowchart of FIG. 9.

In Step S31, the digital circuit 36 initializes the counter Y for counting lines to zero.

In Step S32, the digital circuit 36 determines whether or not it is a predetermined timing T (any T) during a readout period for pixel signals in the Y-th line with the column ADCs 32-1 and 32-2 (whether or not a time period T has elapsed since the start of the readout period for the pixel signals in the Y-th line), and repeats the similar processing until the predetermined timing T during the readout period for the pixel signals in the Y-th line. Then, in a case where the predetermined timing T during the readout period for the pixel signals in the Y-th line comes in Step S32, the processing proceeds to Step S33.

In Step S33, the digital circuit 36 causes the sampling circuit 38 to sample voltage of the power supply VDD.

In Step S34, the digital circuit 36 determines whether or not the sampling circuit 38 completes the sampling, and repeats the similar processing until the sampling is completed. Then, in a case where the sampling circuit 38 completes the sampling of the voltage of the power supply VDD, and gives an output to the AD 37 in Step S34, the processing proceeds to Step S35.

In Step S35, the digital circuit 36 causes the AD 37 to convert the voltage of the power supply VDD, which is to be a sampling result, from an analog signal to a digital signal.

In Step S36, the digital circuit 36 stores information on the voltage of the power supply VDD converted into the digital signal by the AD 37 in association with the predetermined timing T in the Y-th line.

In Step S37, the digital circuit 36 determines whether or not the counter Y reaches the maximum value Ymax (the number of lines in the vertical direction), and in a case where the counter Y does not reach the maximum value, the processing proceeds to Step S38.

In Step S38, the digital circuit 36 increments the counter Y by one, and the processing returns to Step S12.

That is, until the counter Y reaches the maximum value Ymax, in other words, until the voltage of the power supply VDD during AD conversions are measured at the same timing during the readout period for each line in the vertical direction in Step S37, the processing of Steps S32 to S38 is repeated.

Then, in a case where the counter Y reaches the maximum value Ymax in Step S37, the processing proceeds to Step S39.

In Step S39, the digital circuit 36 restores an inter-line variation waveform, that is, a waveform corresponding to the waveform L2 in FIG. 3 on the basis of the information on the voltage of the power supply VDD stored in association with the Y-th line and the predetermined timing T, and stores the waveform.

Figure 10:
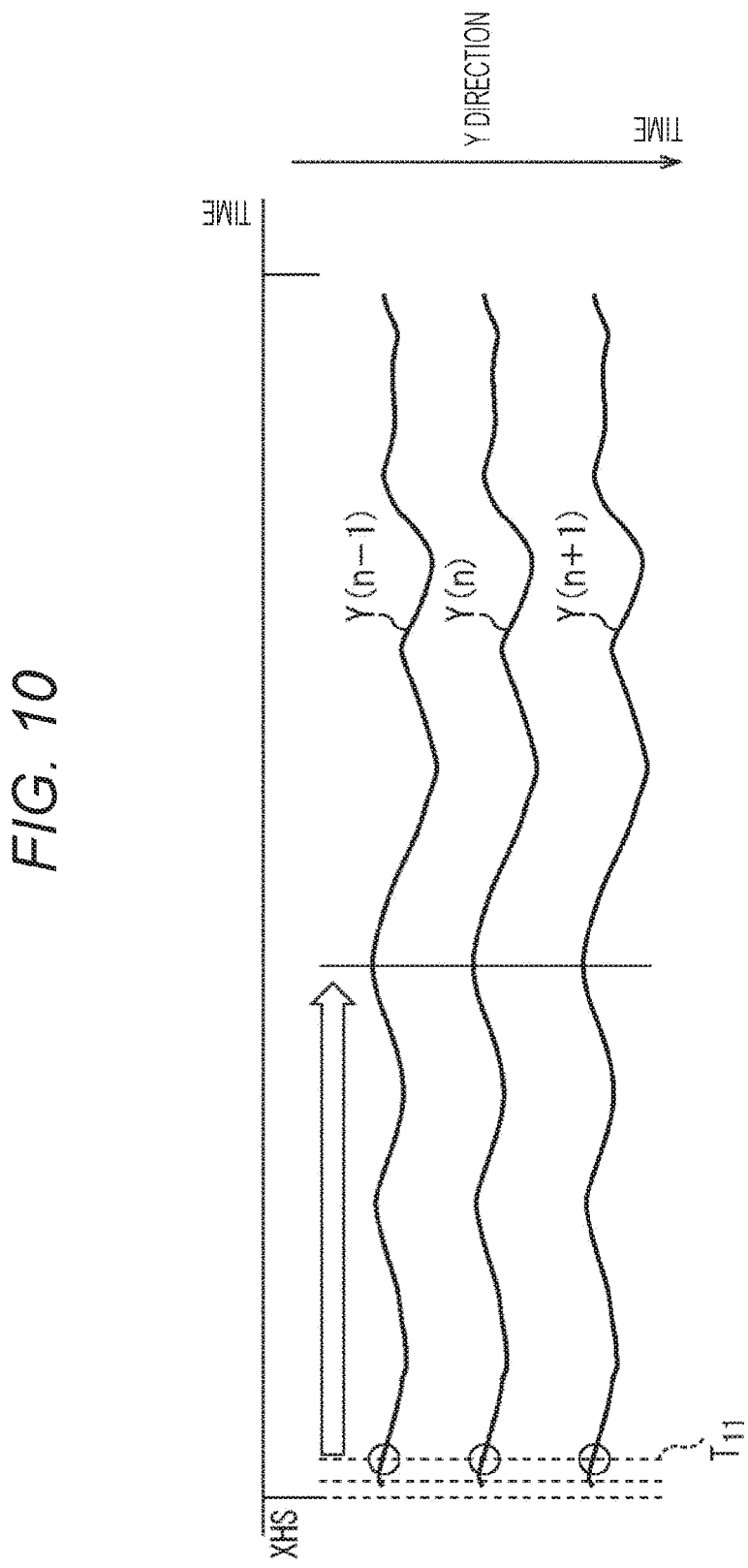
FIG. 10 is a diagram illustrating the measurement processing of the power supply voltage amplitude in the vertical direction.

As illustrated in FIG. 10, for example, the voltage of the power supply VDD at the same timing T11 is measured in each of successive Y(n−1)-th line, Y(n)-th line, and Y(n+1)-th line by the above-described series of processing.

FIG. 10 illustrates an example in which the voltage of the power supply VDD is measured at the successive timings in each of the successive lines. Note that, however, in a case where the AD 37 has a low processing speed, for example, the voltage of the power supply VDD may be measured on the plurality-of-lines basis.

In any way, it is required at least to measure a waveform of the power supply voltage amplitude in the vertical direction by allowing the voltage of the power supply VDD to be measured at the predetermined same timing for all lines.

<Correction Processing>

Figure 11:
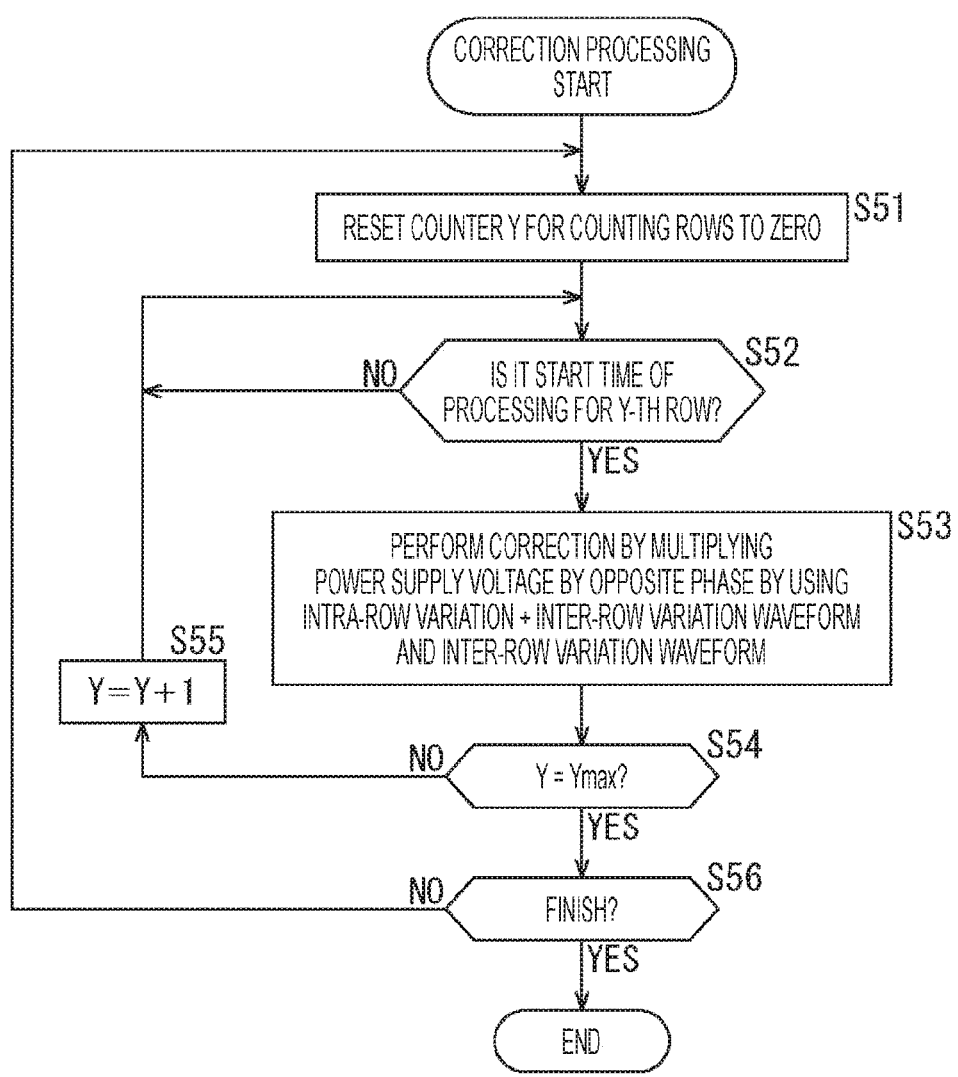
FIG. 11 is a flowchart illustrating correction processing.

Correction processing for removing noise by using the power supply voltage amplitude waveforms in the horizontal and vertical directions acquired by the above-described processing will now be described with reference to the flowchart of FIG. 11. The noise is generated by fluctuation of the voltage of the power supply VDD in pixel signals that are subject to AD conversions with the column ADCs 32-1 and 32-2. Incidentally, the processing presupposes that pixel signals are subject to sequential AD conversions with the column ADCs 32-1 and 32-2.

In Step S51, the digital circuit 36 resets the counter Y for counting lines to zero.

In Step S52, the digital circuit 36 determines whether or not the start timing for reading pixel signals in the Y-th line has come, and repeats the similar processing until the start timing comes. Then, in a case where the start timing is determined to have come in Step S52, the processing proceeds to Step S53.

In Step S53, the digital circuit 36 determines an intra-line variation waveform by using an intra-line variation+inter-line variation waveform and an inter-line variation waveform, and corrects the voltage by multiplying the power supply voltage VDD by an opposite phase.

That is, as described with reference to FIG. 3, the digital circuit 36 can determine the intra-line variation waveform by subtracting the inter-line variation waveform corresponding to the waveform L2 in FIG. 3 from the intra-line variation+inter-line variation waveform corresponding to the waveform L1 in FIG. 3, and can correct the power supply voltage by multiplying the amplitude of the fluctuation of the voltage of the power supply VDD at a corresponding pixel position by the opposite phase of the intra-line variation waveform.

In Step S54, the digital circuit 36 determines whether or not the counter Y reaches the maximum value Ymax (the number of lines in the vertical direction), and in a case where the counter Y does not reach the maximum value, the processing proceeds to Step S55.

In Step S55, the digital circuit 36 increments the counter Y by one, and the processing returns to Step S52.

In a case where the maximum value is reached in Step S54, the processing proceeds to Step S56.

In Step S56, the digital circuit 36 determines whether or not the instruction for termination of the processing is given. In a case where no instruction for termination is given, the processing returns to Step S51, and the subsequent processing is repeated. Then in a case where the instruction for termination is given in Step S56, the processing is terminated.

The above-described processing enables removal of noise in pixel signals. The noise is caused by fluctuation of the voltage of the power supply VDD.

In the above-described processing, an example is described in which each of the intra-line variation+inter-line variation measurement processing and the inter-line variation measurement processing is performed separately, and fluctuation of the power supply voltage VDD is corrected by using the intra-line variation+inter-line variation waveform and the inter-line variation waveform determined by each of the series of processing. Note that, however, the fluctuation of the power supply voltage VDD may be corrected by repeatedly measuring the intra-line variation+inter-line variation measurement processing and the inter-line variation measurement processing in real time through parallel processing to repeat update of the intra-line variation+inter-line variation waveform and the inter-line variation waveform in real time, and then using the most recent intra-line variation+inter-line variation waveform and the inter-line variation waveform that are updated in real time.

This enables, in a case where an environment surrounding the power supply VDD changes, an intra-line variation+inter-line variation waveform and an inter-line variation waveform in accordance with the surrounding environment to be held. Consequently, pixel signals can be corrected with higher precision.

In addition, in a case where an entire apparatus has a larger load due to continuously repeated intra-line variation+inter-line variation measurement processing and inter-line variation measurement processing, the intra-line variation+inter-line variation waveform and the inter-line variation waveform may be updated at predetermined time intervals by repeating the processing at the predetermined time intervals.

Furthermore, in a case where the intra-line variation+inter-line variation measurement processing and the inter-line variation measurement processing are repeatedly performed, a predetermined timing T for measuring the voltage of the power supply VDD may be changed in each repetition of the inter-line variation measurement processing, for example.

Furthermore, in the above description, an example is described in which a timing for measuring the voltage of the power supply VDD is shifted at predetermined time intervals at each time when a line to be read is changed in a predetermined direction in the intra-line variation+inter-line variation measurement processing. The intra-line variation+ inter-line variation waveform, however, may be restored by performing measurements and performing sorting after all the measurements are completed. In the measurements, the timing when the voltage of the power supply VDD is measured is changed by changing the timing in random order so as not to overlap. This also applies to the inter-line variation measurement processing.

Furthermore, in the above description, an example is described in which the sampling unit 38 and the AD 37 are separately provided for measuring the voltage of the power supply VDD. The above-described processing, however, may be performed by borrowing a sampling unit and an AD included in another configuration. This enables a simpler configuration of an apparatus and inhibition of increase in cost.

<Example of Application to Electronic Device>

The above-described solid-state imaging element 11 is applicable to various electronic devices, for example, imaging apparatuses such as digital still cameras and digital video cameras, mobile phones having an imaging function, or other devices having an imaging function.

Figure 12:
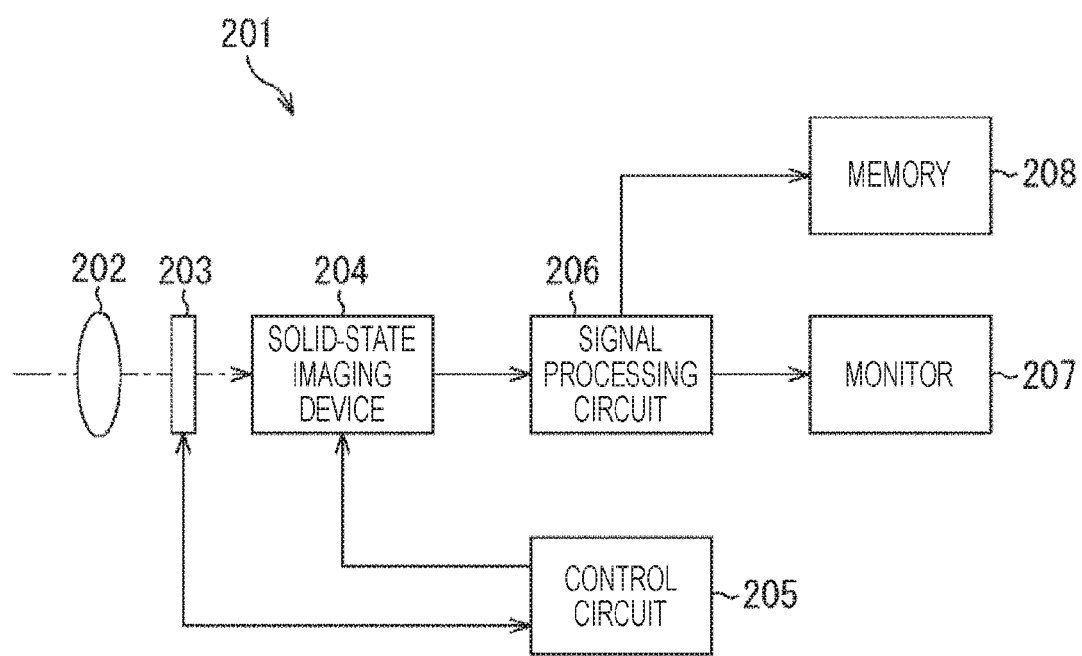
FIG. 12 is a block diagram illustrating a configuration example of an imaging apparatus that is a electronic device to which a camera module of the disclosure is applied.

FIG. 12 is a block diagram illustrating a configuration example of an imaging apparatus that is an electronic device to which the present technology is applied.

An imaging apparatus 201 illustrated in FIG. 12 includes an optical system 202, a shutter apparatus 203, a solid-state imaging element 204, a drive circuit 205, a signal processing circuit 206, a monitor 207, and a memory 208. The imaging apparatus 201 can capture a still image and a moving image.

The optical system 202 includes one or a plurality of lenses. The optical system 202 guides light (incident light) from an object to the solid-state imaging element 204, and forms an image of the light on a light receiving surface of the solid-state imaging element 204.

The shutter apparatus 203 is placed between the optical system 202 and the solid-state imaging element 204, and controls a light application period to the solid-state imaging element 204 and a light blocking period thereagainst depending on control of a drive circuit 1005.

The solid-state imaging element 204 includes a package having the above-described solid-state imaging element. The solid-state imaging element 204 accumulates signal charges for a certain period in response to the light forming an image on the light receiving surface via the optical system 202 and the shutter apparatus 203. The signal charges accumulated in the solid-state imaging element 204 are transferred in response to drive signals (timing signals) supplied from the drive circuit 205.

The drive circuit 205 outputs the drive signals for controlling the transfer operation of the solid-state imaging element 204 and the shutter operation of the shutter apparatus 203 to drive the solid-state imaging element 204 and the shutter apparatus 203.

The signal processing circuit 206 performs various pieces of signal processing to the signal charges output from the solid-state imaging element 204. An image (image data) obtained by performing the signal processing with the signal processing circuit 206 is supplied to the monitor 207 to be displayed, or supplied to the memory 208 to be stored (recorded).

Also in the imaging apparatus 201 configured in such a manner, noise caused by fluctuation of the power supply VDD can be inhibited by applying the solid-state imaging element 11 instead of the optical system 202, the shutter apparatus 203, and the solid-state imaging element 204 described above.

<Usage Example of Solid-State Imaging Element>

Figure 13:
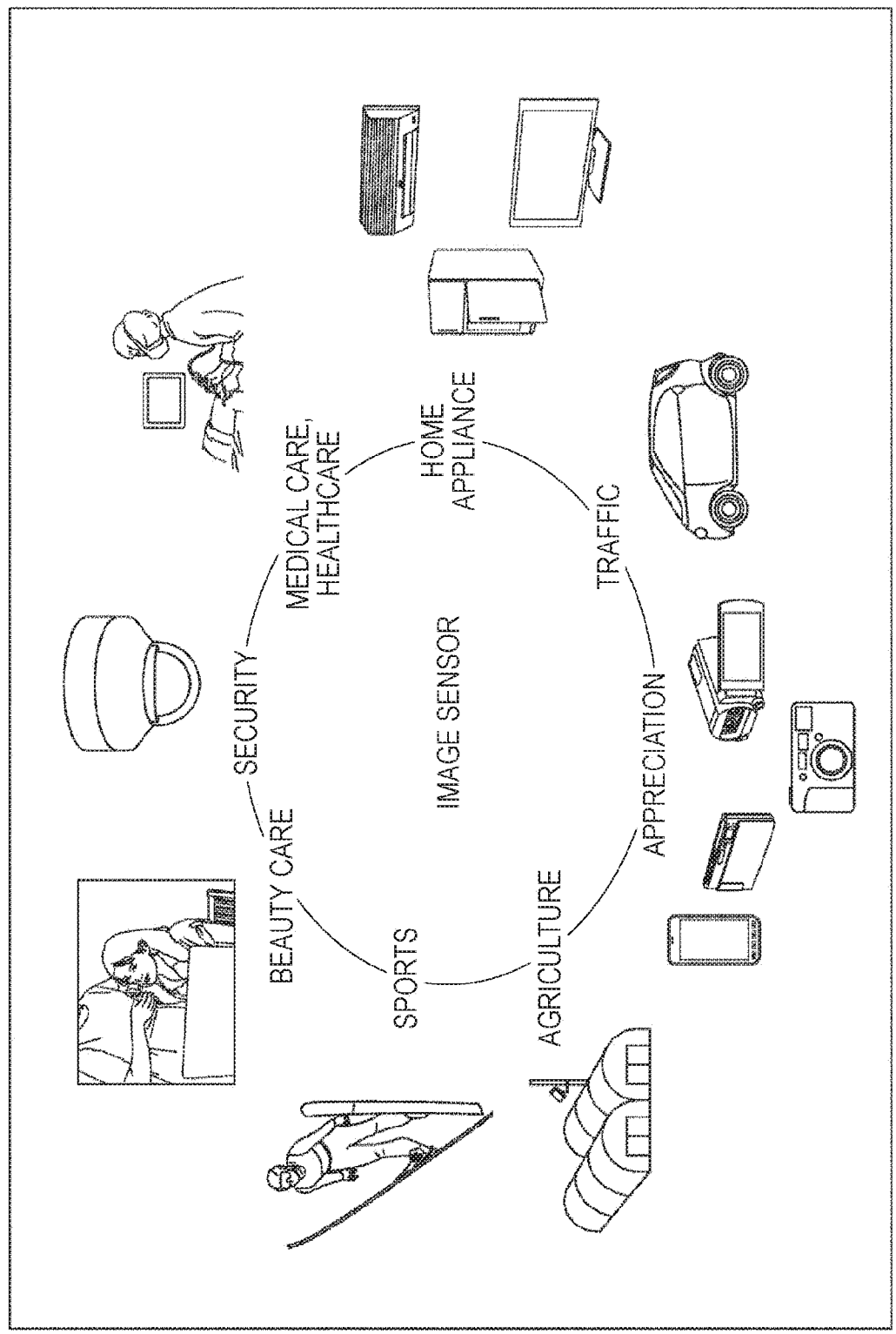
FIG. 13 is a diagram illustrating a usage example of the camera module to which the technology of the disclosure is applied.

FIG. 13 is a diagram illustrating a usage example of the above-described camera module 11.

For example, as described below, the above-described camera module can be used in various cases of sensing light such as visible light, infrared light, ultraviolet light, and X-rays.

Apparatuses for capturing an image used for viewing, such as digital cameras and portable devices with a camera function Apparatuses used for traffic, such as on-vehicle sensors for photographing, for example, the front, the back, the surroundings, and the inside of a vehicle for the sake of, for example, safe driving by, for example, automatic stop, and recognition of condition of a driver, surveillance cameras for monitoring traveling vehicles and roads, and distance measuring sensors for measuring distances between, for example, vehicles Apparatuses used for home appliances, such as TVs, refrigerators, and air conditioners, for photographing a gesture of a user and operating the device in response to the gesture Apparatuses used for medical care and healthcare, such as endoscopes and apparatuses for performing angiography by receiving infrared light Apparatuses used for security, such as surveillance cameras for security and cameras for person authentication Apparatuses used for beauty care, such as skin measuring instruments for photographing skin and microscopes for photographing scalp Apparatuses used for sports, such as action cameras and wearable cameras for applications such as sports Apparatuses used for agriculture, such as cameras for monitoring conditions of fields and crops Note that the disclosure can have configurations as described below.

<1> A solid-state imaging element including:

an imaging element including a plurality of pixels arranged in a two-dimensional array, the pixels each generating a pixel signal in response to a light amount of incident light;

a pixel signal analog/digital conversion unit that reads the pixel signals on a line basis, and sequentially performs analog/digital conversions of the pixel signals on the line basis;

a sampling unit that samples voltage of a power supply configured to supply power; and an operation control unit that controls operation of the sampling unit, in which the operation control unit causes the sampling unit to sample the voltage of the power supply at different timings being not overlapped on the line basis, during a period, on the line basis, in which the pixel signal analog/digital conversion unit sequentially performs reading and analog/digital conversions on the line basis.

<2> The solid-state imaging element according to <1>, in which the operation control unit causes the sampling unit to sample the voltage of the power supply at a timing shifted, on the line basis, from the timing at which a sampling is performed in the most recent processing, during a period, on the line basis, in which the pixel signal analog/digital conversion unit sequentially performs reading and analog/digital conversions on the line basis.

<3> The solid-state imaging element according to <1> or <2>, in which the operation control unit causes the sampling unit to sample the voltage of the power supply at a timing adjacent, on the line basis, to the timing at which a sampling is performed in the most recent processing, during a period, on the line basis, in which the pixel signal analog/digital conversion unit sequentially performs reading and analog/digital conversions on the line basis.

<4> The solid-state imaging element according to any one of <1> to <3>, in which, in a case where analog/digital conversions are performed at different timings being not overlapped on the line basis during a period, on the line basis, in which the pixel signal analog/digital conversion unit sequentially performs reading and analog/digital conversions on the line basis, the operation control unit causes the sampling unit to sample the voltage of the power supply, determines a waveform containing intra-line variation and inter-line variation of the voltage of the power supply from sampling results at all of different timings being not overlapped on the line basis, and stores the waveform.

<5> The solid-state imaging element according to any one of <1> to <4>, in which the operation control unit causes the sampling unit to further sample the voltage of the power supply at the same timing as, on the line basis, the timing at which a sampling is performed in the most recent processing, during a period, on the line basis, in which the pixel signal analog/digital conversion unit sequentially performs reading and analog/digital conversions on the line basis.

<6> The solid-state imaging element according to any one of <1> to <5>, in which the operation control unit causes the sampling unit to further sample the voltage of the power supply at the same timing as, on the line basis, the timing at which a sampling is performed in the most recent processing, during a period, on the line basis, in which the pixel signal analog/digital conversion unit sequentially performs reading and analog/digital conversions on the line basis, determines an inter-line variation waveform of the voltage of the power supply from sampling results, and stores the inter-line variation waveform.

<7> The solid-state imaging element according to any one of <1> to <6>, in which the operation control unit:
causes the sampling unit to sample the voltage of the power supply at different timings being not overlapped on the line basis, during a period, on the line basis, in which the pixel signal analog/digital conversion unit sequentially performs reading and analog/digital conversions on the line basis, determines a waveform containing intra-line variation and inter-line variation of the voltage of the power supply from sampling results at all of different timings being not overlapped on the line basis, and stores the waveform;
causes the sampling unit to further sample the voltage of the power supply at the same timing as, on the line basis, the timing at which a sampling is performed in the most recent processing, during a period, on the line basis, in which the pixel signal analog/digital conversion unit sequentially performs reading and analog/digital conversions on the line basis, determines an inter-line variation waveform of the voltage of the power supply from sampling results, and stores the inter-line variation waveform;
determines the intra-line variation waveform by subtracting the inter-line variation waveform from the waveform containing the intra-line variation and the inter-line variation; and
corrects an amplitude of the voltage of the power supply by using the intra-line variation waveform.

<8> The solid-state imaging element according to any one of <1> to <7>, further including a power supply voltage analog/digital conversion unit that performs an analog/digital conversion of an amplitude of the voltage of the power supply sampled by the sampling unit,
in which the operation control unit causes the sampling unit to sample the subsequent voltage of the power supply after the power supply voltage analog/digital conversion unit performs an analog/digital conversion of the voltage of the power supply sampled most recently.

<9> The solid-state imaging element according to <8>, in which, in a case where analog/digital conversions are performed at different timings being not overlapped on the line basis during a period, on the line basis, in which the pixel signal analog/digital conversion unit sequentially performs reading and analog/digital conversions on the line basis after the power supply voltage analog/digital conversion unit performs an analog/digital conversion of the voltage of the power supply sampled most recently by the sampling unit, the operation control unit causes the sampling unit to sample the voltage of the power supply.

<10> A method of operating a solid-state imaging element, the solid-state imaging element including:
an imaging element including a plurality of pixels arranged in a two-dimensional array, the pixels each generating a pixel signal in response to a light amount of incident light;
a pixel signal analog/digital conversion unit that reads the pixel signals on a line basis, and sequentially performs analog/digital conversions of the pixel signals on the line basis;
a sampling unit that samples voltage of a power supply configured to supply power; and
an operation control unit that controls operation of the sampling unit,
in which the operation control unit causes the sampling unit to sample the voltage of the power supply to be supplied to the pixels at different timings being not overlapped on the line basis, during a period, on the line basis, in which the pixel signal analog/digital conversion unit sequentially performs reading and analog/digital conversions on the line basis.

<11> An imaging apparatus including:
an imaging element including a plurality of pixels arranged in a two-dimensional array, the pixels each generating a pixel signal in response to a light amount of incident light;
a pixel signal analog/digital conversion unit that reads the pixel signals on a line basis, and sequentially performs analog/digital conversions of the pixel signals on the line basis;
a sampling unit that samples voltage of a power supply configured to supply power; and
an operation control unit that controls operation of the sampling unit,
in which the operation control unit causes the sampling unit to sample the voltage of the power supply at different timings being not overlapped on the line basis, during a period, on the line basis, in which the pixel signal analog/digital conversion unit sequentially performs reading and analog/digital conversions on the line basis.

<12> An electronic device including:
an imaging element including a plurality of pixels arranged in a two-dimensional array, the pixels each generating a pixel signal in response to a light amount of incident light;
a pixel signal analog/digital conversion unit that reads the pixel signals on a line basis, and sequentially performs analog/digital conversions of the pixel signals on the line basis;
a sampling unit that samples voltage of a power supply configured to supply power; and
an operation control unit that controls operation of the sampling unit,
in which the operation control unit causes the sampling unit to sample the voltage of the power supply at different timings being not overlapped on the line basis, during a period, on the line basis, in which the pixel signal analog/digital conversion unit sequentially performs reading and analog/digital conversions on the line basis.

REFERENCE SIGNS LIST

11 Solid-state imaging element
31 Pixel array (PIX)
32-1, 32-2 Column ADC
33 Vertical transfer circuit
34 Bias circuit (BIAS)
35 DAC
36 Digital circuit
37 AD
38 Sampling circuit (sampling)
39 PLL
40 IF

The invention claimed is:

1. A solid-state imaging element, comprising:
an imaging element including a plurality of pixels arranged in a two-dimensional array, the pixels each generating a pixel signal in response to a light amount of incident light;
a pixel signal analog/digital conversion unit configured to read the pixel signals on a line basis, and sequentially performs analog/digital conversions of the pixel signals on the line basis;
a sampling unit that samples voltage of a power supply configured to supply power; and
an operation control unit configured to control operation of the sampling unit to sample the voltage of the power supply at different timings being not overlapped on the line basis, during a period, on the line basis, in which the pixel signal analog/digital conversion unit sequentially performs reading and analog/digital conversions on the line basis.

2. The solid-state imaging element according to claim 1, wherein the operation control unit is further configured to control the sampling unit to sample the voltage of the power supply at a timing shifted, on the line basis, from a timing at which a sampling is performed in a most recent processing, during a period, on the line basis, in which the pixel signal analog/digital conversion unit sequentially performs reading and analog/digital conversions on the line basis.

3. The solid-state imaging element according to claim 1, wherein the operation control unit is further configured to control the sampling unit to sample the voltage of the power supply at a timing adjacent, on the line basis, to the timing at which a sampling is performed in a most recent processing, during a period, on the line basis, in which the pixel signal analog/digital conversion unit sequentially performs reading and analog/digital conversions on the line basis.

4. The solid-state imaging element according to claim 1, wherein, in a case where analog/digital conversions are performed at different timings being not overlapped on the line basis during a period, on the line basis, in which the pixel signal analog/digital conversion unit sequentially performs reading and analog/digital conversions on the line basis, the operation control unit is further configured to control the sampling unit to sample the voltage of the power supply, determine a waveform containing intra-line variation and inter-line variation of the voltage of the power supply from sampling results at all of different timings being not overlapped on the line basis, and store the waveform.

5. The solid-state imaging element according to claim 1, wherein the operation control unit is further configured to control the sampling unit to further sample the voltage of the power supply at a same timing as, on the line basis, a timing at which a sampling is performed in a most recent processing, during a period, on the line basis, in which the pixel signal analog/digital conversion unit sequentially performs reading and analog/digital conversions on the line basis.

6. The solid-state imaging element according to claim 1, wherein the operation control unit is further configured to control the sampling unit to further sample the voltage of the power supply at a same timing as, on the line basis, a timing at which a sampling is performed in a most recent processing, during a period, on the line basis, in which the pixel signal analog/digital conversion unit sequentially performs reading and analog/digital conversions on the line basis, determine an inter-line variation waveform of the voltage of the power supply from sampling results, and store the inter-line variation waveform.

7. The solid-state imaging element according to claim 1, wherein the operation control unit is further configured to:
control the sampling unit to sample the voltage of the power supply at different timings being not overlapped on the line basis, during a period, on the line basis, in which the pixel signal analog/digital conversion unit sequentially performs reading and analog/digital conversions on the line basis, determine a waveform containing intra-line variation and inter-line variation of the voltage of the power supply from sampling results at all of different timings being not overlapped on the line basis, and store the waveform;
control the sampling unit to further sample the voltage of the power supply at a same timing as, on the line basis, a timing at which a sampling is performed in a most recent processing, during a period, on the line basis, in which the pixel signal analog/digital conversion unit sequentially performs reading and analog/digital conversions on the line basis, determine an inter-line variation waveform of the voltage of the power supply from sampling results, and store the inter-line variation waveform;
determine the intra-line variation waveform by subtracting the inter-line variation waveform from the waveform containing the intra-line variation and the inter-line variation; and
correct an amplitude of the voltage of the power supply by using the intra-line variation waveform.

8. The solid-state imaging element according to claim 1, further comprising a power supply voltage analog/digital conversion unit that performs an analog/digital conversion of an amplitude of the voltage of the power supply sampled by the sampling unit, wherein the operation control unit is further configured to control the sampling unit to sample a subsequent voltage of the power supply after the power supply voltage analog/digital conversion unit performs an analog/digital conversion of the voltage of the power supply sampled most recently.

9. The solid-state imaging element according to claim 8, wherein, in a case where analog/digital conversions are performed at different timings being not overlapped on the line basis during a period, on the line basis, in which the pixel signal analog/digital conversion unit sequentially performs reading and analog/digital conversions on the line basis after the power supply voltage analog/digital conversion unit performs an analog/digital conversion of the voltage of the power supply sampled most recently by the sampling unit, the operation control unit is further configured to control the sampling unit to sample the voltage of the power supply.

10. An imaging apparatus comprising:
   an imaging element including a plurality of pixels arranged in a two-dimensional array, the pixels each generating a pixel signal in response to a light amount of incident light;
   a pixel signal analog/digital conversion unit configured to read the pixel signals on a line basis, and sequentially performs analog/digital conversions of the pixel signals on the line basis;
   a sampling unit that samples voltage of a power supply configured to supply power; and
   an operation control unit configured to control operation of the sampling unit to sample the voltage of the power supply at different timings being not overlapped on the line basis, during a period, on the line basis, in which the pixel signal analog/digital conversion unit sequentially performs reading and analog/digital conversions on the line basis.

11. An electronic device, comprising:
   an imaging element including a plurality of pixels arranged in a two-dimensional array, the pixels each generating a pixel signal in response to a light amount of incident light;
   a pixel signal analog/digital conversion unit configured to read the pixel signals on a line basis, and sequentially performs analog/digital conversions of the pixel signals on the line basis;
   a sampling unit that samples voltage of a power supply configured to supply power; and
   an operation control unit configured to control operation of the sampling unit to sample the voltage of the power supply at different timings being not overlapped on the line basis, during a period, on the line basis, in which the pixel signal analog/digital conversion unit sequentially performs reading and analog/digital conversions on the line basis.

* * * * *